Oct. 14, 1930.  H. C. MOORE ET AL  1,778,427
APPARATUS FOR DISPENSING LIQUIDS UNDER PRESSURE
Filed Feb. 16, 1929
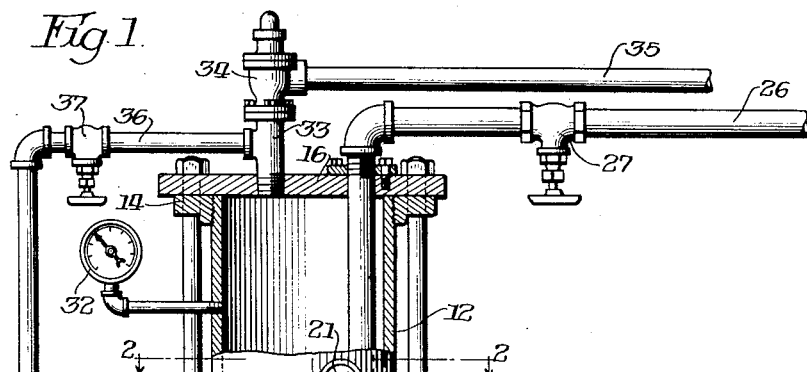
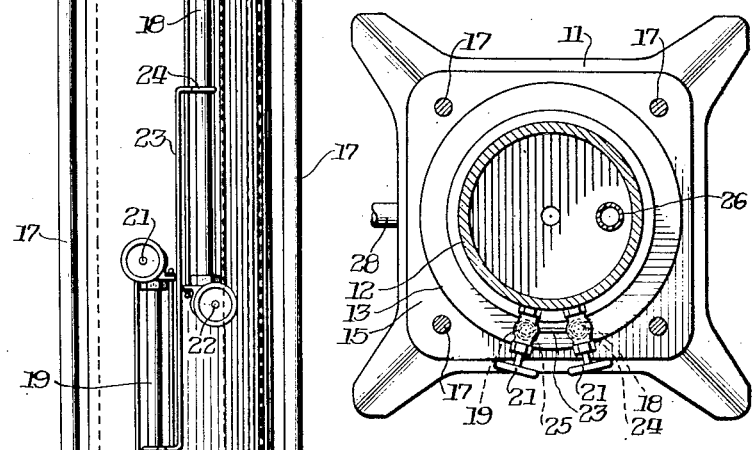
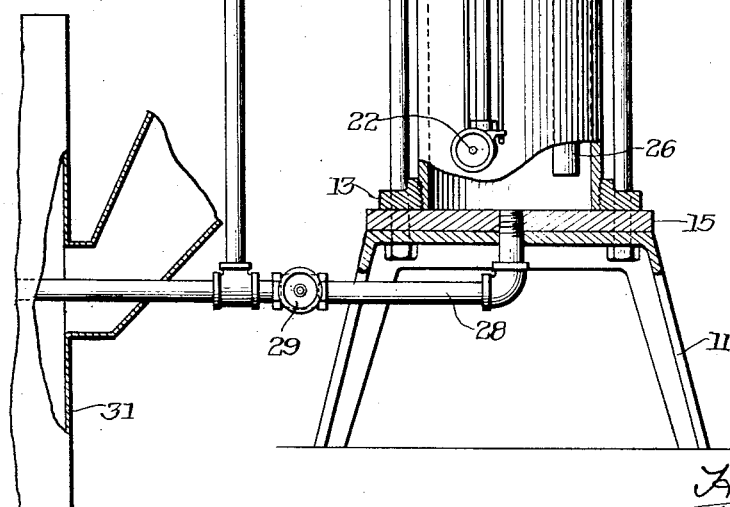
Inventors
Harry C. Moore
Robert White
By Walter M. Fuller Atty.

Patented Oct. 14, 1930

1,778,427

UNITED STATES PATENT OFFICE

HARRY C. MOORE, OF CHICAGO, ILLINOIS, AND ROBERT WHITE, OF METUCHEN, NEW JERSEY, ASSIGNORS TO ARMOUR FERTILIZER WORKS, OF CHICAGO, ILLINOIS, A CORPORATION OF NEW JERSEY

APPARATUS FOR DISPENSING LIQUIDS UNDER PRESSURE

Application filed February 16, 1929. Serial No. 340,464.

This invention relates to appliances permitting an accurate measuring or weighing of definite amounts of a volatile liquid under pressure so that the charges thus determined may be used as occasion requires, but, more specifically, the new and improved apparatus is especially adapted for use in the employment of liquid anhydrous ammonia in the production of fertilizer.

Such ammonia ordinarily arrives at the fertilizer manufacturing plant under substantial pressure in strong pressure-resisting or steel tank cars and the purpose of the present invention is to supply a suitable and convenient means for handling such liquid and for introducing it in measured or weighed charges into the fertilizer mixer.

To enable those skilled in this art to fully understand the invention and to appreciate its advantages, a present desirable or preferred embodiment of the invention has been illustrated in the accompanying drawing, forming a part of this specification, and in the views of such drawing like reference characters have been employed to designate the same parts.

In this drawing:

Figure 1 is a combined elevation and partial section of the improved apparatus; and Figure 2 is a horizontal section on line 2—2 of Figure 1.

Referring to this drawing, it will be noted that the novel appliance includes a convenient legged base 11 on which is mounted an upright, cylindrical tank or receptacle 12 having threaded ends screwed into end rings or flanges 13, 14 against which the bottom 15 and the top 16 are firmly and securely held by means of long bolts 17, 17 extended through registering apertures thereof, whereby the tank is capable of withstanding a substantial internal pressure.

Such tank is fitted with two upright gauge-glasses 18 and 19 at different levels and offset angularly around the axis of the tank with relation to one another, each of such glasses being supplied at its two ends with valves 21 and 22 of known type which close automatically if perchance the glass breaks.

A wire gauge 23 having upper and lower terminal index loops 24 and 25, respectively, encircling the gauge-glasses 18 and 19 and mounted to be moved lengthwise thereon and to be held in any adjusted position by reason of the frictional engagement of such loops or eyes with the glasses, or by any other appropriate means, is provided for the purpose hereinafter specified, the distance between the index loops 24 and 25 representing a definite or predetermined volume or weight of the liquid to be used as a single charge in the fertilizer manufacture.

Inlet or admission pipe 26, equipped with a control-valve 27, extends through the top wall of the tank with its lower end delivering down near the bottom wall, such pipe being arranged for direct connection with the tank-car (not shown) containing the liquid anhydrous ammonia under high pressure.

A discharge or delivery pipe 28 fitted with a hand-operated control-valve 29 connects with the interior of the container or tank through its bottom wall, such pipe leading to the fertilizer mixer 31 shown fragmentarily.

The reservoir or receptacle 12 is desirably furnished, near its upper end, with a pressure-gauge 32 of any suitable form, and a pipe 33, communicating with the interior of the tank through its top wall, is connected to an automatic pressure relief-valve 34, the discharge pipe 35 from which may deliver its contents into the atmosphere, pipe 33 being joined to pipe 28 by a conduit 36 supplied with a hand-actuated control-valve 37.

The improved and new apparatus is operated practically as follows, assuming that the entrance or inlet pipe 26 with its valve 27 closed is coupled to the tank-car loaded with liquid anhydrous ammonia under pressure.

If valves 29 and 37 were closed and valve 27 then opened, the liquid ammonia would readily flow into the tank until the pressure of its vaporized ammonia gas above the liquid in the tank balanced that in the tank-car and then practically no more would flow into the tank or container, resulting in only partially filling the tank.

Accordingly, valve 29 is maintained closed with valve 37 open, whereupon valve 27 is opened until the desired amount of liquid has passed into the tank, such complete or adequate flow being permitted by reason of the escape of ammonia gas through the pipes 33 and 36 into the fertilizer mixer where it reacts with the ingredients undergoing mixture therein, whereby such gas is not lost or wasted, but, of course, it may, instead, be passed into water or allowed to escape into the atmosphere, if preferred.

When approximately an adequate supply of the liquid ammonia has entered the tank with its level showing in the gauge-glass 18, valves 37 and 27 are closed, thus precluding any further admission of the liquid.

Thereupon, the gauge or guide 23 is adjusted vertically to position its upper index ring or loop 24 coincident with the liquid level in glass 18.

To deliver the predetermined volume or weight of the liquid into the fertilizer mixer, the operator opens valve 29 allowing the liquid to flow through the pipe 28 into the mixer at which time its pressure is reduced to atmospheric, it being understood that the vapor or gas pressure in the tank above the liquid affords adequate pressure for the ready expulsion of the liquid as soon as the discharge-valve is opened.

Valve 29 is kept open until the level of the liquid ammonia registers with the lower index loop 25, whereupon it is closed, thus assuring that a definite amount or weight of the liquid has been discharged into the mixer to form an ingredient or constituent of the fertilizer mixture therein.

Instead of determining the volume of the liquid thus dispensed, it may, in some cases, be preferable to actually weigh the liquid, but this is a matter of mere choice, since, in either instance, the desired volume or weight is ascertained and delivered.

The invention is not limited and restricted to the precise and exact mechanical details presented and many minor changes may be incorporated in the structure without departure from the heart and essence of the invention as defined by the appended claims and without the loss or sacrifice of any of its material benefits or advantages.

We claim:

1. In an appliance for dispensing determined amounts of a liquid under its own vapor pressure greater than atmospheric, the combination of a tank, a valved liquid admission-pipe delivering into said tank adapted to be connected to a container having a volatile liquid supply under its own vapor pressure greater than atmospheric, a valved liquid discharge-pipe for said tank, a valved gas-pipe connected to the upper portion of said tank and discharging, when open, at its delivery end into atmospheric pressure to vent the tank to permit the liquid under its own vapor pressure to flow through said admission-pipe into the tank, and means to ascertain when a predetermined amount of the liquid contents of said tank has been delivered from such tank through said discharge-pipe.

2. In an appliance for dispensing determined amounts of a liquid under its own vapor pressure greater than atmospheric into a fertilizer mixer, the combination of a tank having gauge-glasses at different levels, a double index cooperating with and manually adjustable lengthwise of said gauge-glasses, a valved liquid admission-pipe delivering into said tank and adapted to be connected to a container having a volatile liquid supply under its own vapor pressure greater than atmospheric, a valved liquid discharge-pipe for said tank, and a valved gas-pipe connected to the upper portion of said tank and discharging, when open, at its delivery end into atmospheric pressure to vent the tank to permit the liquid under its own vapor pressure to flow into the tank through said admission-pipe, said double index permitting the operator to ascertain when a predetermined amount of the liquid contents of the tank has been delivered from the tank through said discharge-pipe.

In witness whereof we have hereunto set our hands.

HARRY C. MOORE.
ROBERT WHITE.